No. 678,494. Patented July 16, 1901.
W. T. JONES.
CAN HEADING MACHINE.
(Application filed Dec. 22, 1900.)

(No Model.) 3 Sheets—Sheet 1.

No. 678,494. Patented July 16, 1901.
W. T. JONES.
CAN HEADING MACHINE.
(Application filed Dec. 22, 1900.)
(No Model.) 3 Sheets—Sheet 2.

Witnesses, Inventor,
William T. Jones
By Dewey Strong & Co.
Attys

No. 678,494. Patented July 16, 1901.
W. T. JONES.
CAN HEADING MACHINE.
(Application filed Dec. 22, 1900.)
(No Model.) 3 Sheets—Sheet 3.
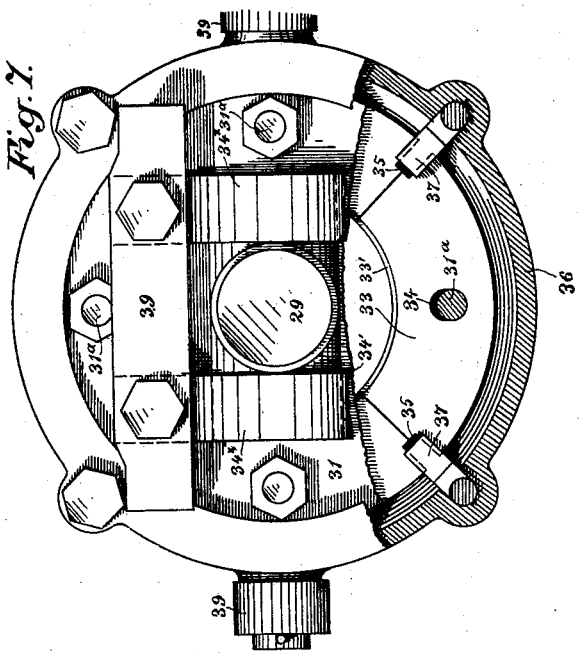
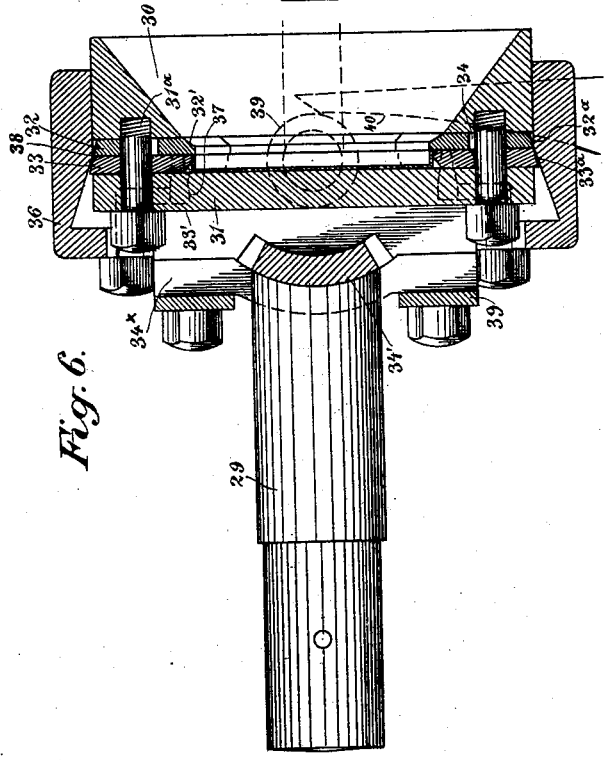
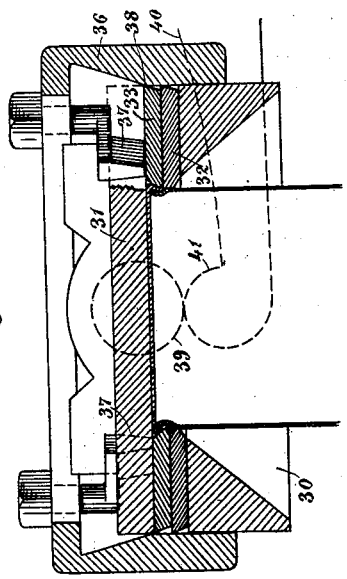

UNITED STATES PATENT OFFICE.

WILLIAM T. JONES, OF SAN FRANCISCO, CALIFORNIA, ASSIGNOR OF ONE-HALF TO HENRY DOYLE, OF SAME PLACE.

CAN-HEADING MACHINE.

SPECIFICATION forming part of Letters Patent No. 678,494, dated July 16, 1901.

Application filed December 22, 1900. Serial No. 40,768. (No model.)

*To all whom it may concern:*

Be it known that I, WILLIAM T. JONES, a citizen of Canada, residing in the city and county of San Francisco, State of California, have invented an Improvement in Can-Heading Machines; and I hereby declare the following to be a full, clear, and exact description of the same.

My invention relates to improvements in machines for automatically placing the heads of cans in position upon can-bodies.

It consists, essentially, of a horizontal endless conveyer, upon which the cans are carried throughout the operation in the machine, a stop-lever which regulates the admission of cans thereon, a revolving spacing and timing guide, a can-head feeder in which the cam-heads enter and means by which the flanges of the heads are prevented from overlapping, a revolving carrier by which the heads are taken singly from the feeder and delivered into dies upon a revolving support, the heads then placed upon the cans and crimped thereon, and of details more fully explained in the following specification and accompanying drawings.

Figure 1:
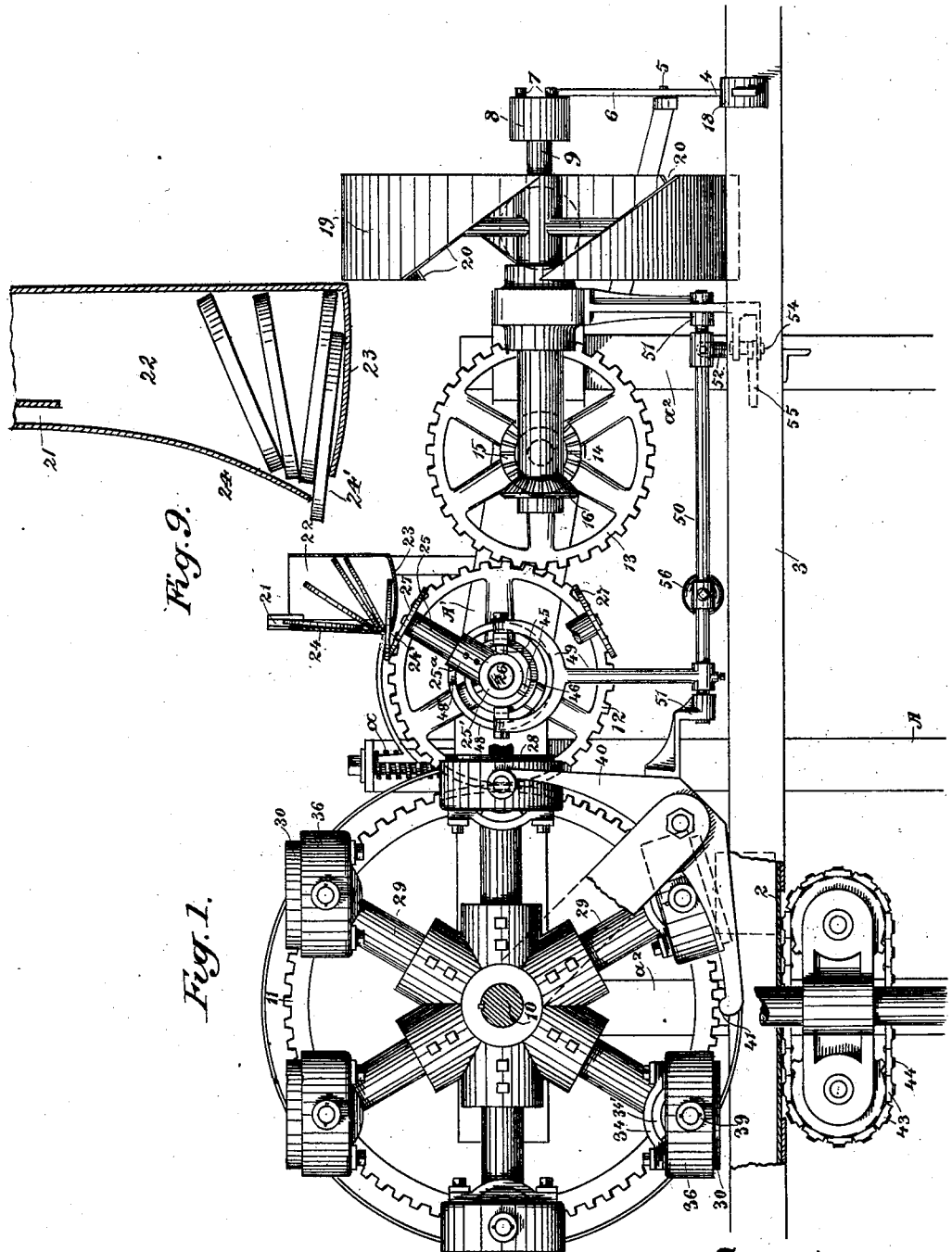
Figure 2:
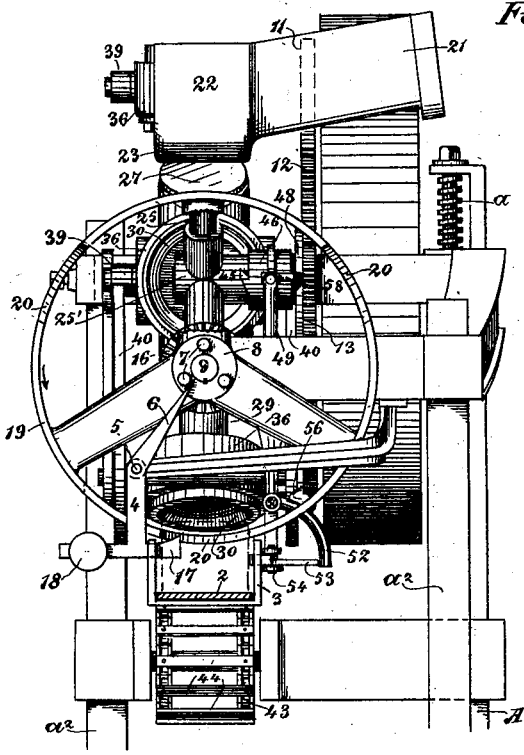
Figure 3:
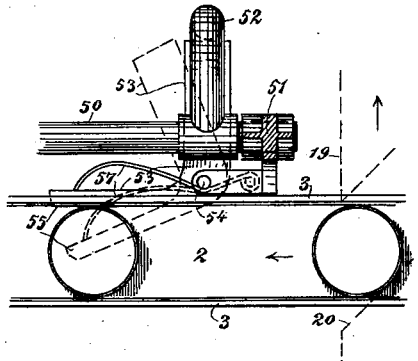
Figure 10:
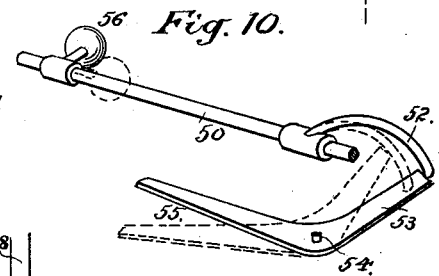
Figure 4:
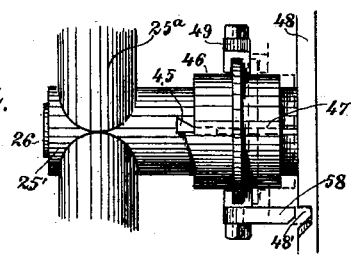
Figure 5:
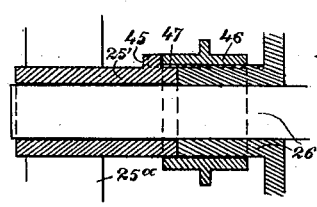

Figure 1 is a side elevation of the machine. Fig. 2 is a front end view of the same. Fig. 3 is a plan view of the lower part of the device to control the feed of the can-heads. Fig. 4 is a top view of the upper portion of said device. Fig. 5 is a longitudinal section of the same. Fig. 6 is a section through the heading device. Fig. 7 is a top view of the same. Fig. 8 is a similar view to Fig. 6, showing the heading completed. Fig. 9 is a sectional enlarged detail of the feeder. Fig. 10 is a detail showing the arm 55 and its adjuncts.

The object of my invention is to provide a device wherein either empty can-bodies or cans already filled may receive their heads preparatory to soldering or otherwise sealing.

Having reference to the drawings, A represents a suitable base upon which the mechanism is supported.

2 is a horizontal endless carrier upon which the cans or can-bodies to be headed are carried through the machine.

3 is a trough inclosing the carrier and preventing lateral displacement of the cans.

4 is a stop-lever pivoted at 5 upon the frame, having an arm 6, which is intermittently engaged by pins 7 upon a collar 8, secured to the shaft 9. This shaft 9 is driven from the main shaft 10 in the following manner: Upon this main power-shaft 10 is a gear-wheel 11, meshing with a second gear 12, which in turn engages a gear-wheel 13. The wheel 13 has a short shaft 14, upon which is a bevel-gear 15, engaging with a bevel-pinion 16 upon the above-mentioned shaft 9. The timing of these parts is so regulated that the various operations in the machine occur at certain and proper intervals. This mechanism is supported in a frame A', which is adjustable vertically above the endless carrier by means of a lifting-screw $a$, placed centrally of this frame. The ends of the frame are supported from lateral and longitudinal displacement by means of guides $a^2$. This vertical adjustment is for the purpose of adapting the machine to cans of different heights. The entry of the cans upon the endless conveyer 2 is regulated by the stop-lever 4. This lever has an arm 17 extending into the trough a sufficient distance to interrupt the travel of the can. As the shaft 9 is revolved one of the pins 7 strikes the arm 6, oscillates the lever, and allows the cans to pass. By means of a weight 18 the lever falls back again into position and holds the next can until it is time for its entry into the machine. The can next comes in contact with a revolving guide 19. This guide or wheel 19 is fixed upon the shaft 9 and has oblique transverse slots 20 in its rim corresponding in width approximately to the diameter of the can and arranged in relation to the aforesaid-mentioned pins 7. A can striking against the rim of the wheel is held until the appearance of a slot, through which the can passes upon the belt carrier, the revolution of the wheel and the travel of the belt being so regulated as to permit this longitudinal travel of the can without its being thrown from the belt by the wheel. This guide-wheel serves to correct any irregularity in the timing of the entry of the cans, so that they will come in contact with their heads at the right moment, as will be seen later.

The cans may be either cylindrical, square, or oval, and the heads to be placed thereon have an annular flange fitting over the end of the can. The machine is quickly adapted not only to the different shapes of can, but to the different sizes, as will be hereinafter shown. These can-heads are first fed in through a narrow runway 21 to the hopper or feeder 22. This hopper 22 has a curved bottom 23. The rear wall 24 of the feeder is curved inwardly, as shown in Fig. 9, and between the lower edge of this wall and the bottom is an outlet 24'. A can-head entering upon its edge through the runway 21 falls into the feeder and is so deflected by the wall 24 as finally to rest upon the bottom of the feeder with a part of the flanged portion of the can-head projecting beyond the edge of the bottom and through this outlet or slot 24'. Directly beneath this hopper is the revolving carrier 25. This carrier consists of radial arms removably secured on the hub $25^a$ of a sleeve 25', loosely mounted upon the shaft 26, which latter carries the gear-wheel 12. The means by which this carrier is thrown in and out of engagement with this shaft and wheel will be shown later. To the ends of the arms or radii of the carrier 25 are secured disks 27, which are of the diameter and shape of a can-body. By the revolution of this carrier 25 each of these disks successively engages a projecting can-head and carries it forward into a die upon the revolving header. Where cans of different shapes and sizes are to be headed, the arms of the carrier are replaced by others having disks of the size and shape corresponding to the particular can. The removal of one can-head from the feeder allows another to fall into place, and the shape of this feeder prevents any overlapping of the flanges of the heads in entering and falling or any jamming of the heads in their withdrawal through the opening 24'. This header consists of radial arms 29, removably secured in a hub upon the main shaft 10, having pivotally hung at their outer ends the dies 28. These dies are constructed and operated as follows: 30 is an outer funnel-shaped portion secured to a pressure-plate 31 by bolts $31^a$. Intermediate of this pressure-plate and the funnel are the expansible disks or chucks 32 and 33. These chucks consist of quadrants, in each of which are slots 34, through which the bolts $31^a$ pass and by which they are held in position. Between each of these quadrants are cut-out portions 35. The edge 32' of the opening of the chuck 32 is inclined inwardly and upwardly, and the outer edge $32^a$ of the chuck is inclined outwardly and upwardly. The inner edge 33' of the chuck 33 is inclined downwardly and inwardly, and its outer edge $33^a$ is inclined outwardly and upwardly. The die is pivotally secured to the arm 29 by means of curved straps $34^\times$, fitting over a footpiece 34' on the arm. A cap 36 incloses loosely the sides and top of the die in such manner as to have a certain sliding movement to and from the center of the header and is kept from sliding down on the arms 29 by means of cross-bars 39, secured to the straps $34^\times$. In the top of this cap and projecting inwardly are the wedges 37, which are adapted to enter the cut-out portions 35 of the chucks and open the chucks, as will be shortly explained. The inner walls of the cap are parallel with its axis for a distance from the bottom and then flare out to form an annular shoulder 38. Upon the exterior of the cap are rollers 39, which are adapted to engage the cams 40 in the revolution of the header. There are two of these cams, one upon either side of the header, so that the cap will be lifted equally.

The manner in which the can-heads are received into the die and placed upon a can-body is as follows: The head upon one of the disks of the revolving carrier 25 enters the funnel 30 of the die, where it comes in contact with the inclined edges 32' of the opening of the chuck 32. The instant that the edge of the head passes into the die beyond this chuck 32 the rotation of the header has brought the rollers of the cap upon the cams 40. The cap is thereupon lifted or moved in a direction toward the center of the header, so that the edge of the shoulder 38 comes in contact with the inclined outer edge $32^a$ of the chuck 32 and causes this chuck to contract until its opening is equal to that of a can-body. The head thus rests upon an annular ledge upon this chuck and is supported by the pressure-plate 31. As the header revolves a can-body is approaching upon the carrier 2, the die closes over it, and the end of the can passes through the opening of the chuck 32 and the head is forced thereon. The pivoting of the die upon the stem 29 allows a ready adjustment to this constantly-varying change of position to the die and its relation to the can, so that the pressure is exerted equally upon all sides of the can. The constant approach of the die toward the belt forces the can-head more securely upon the can until the rollers 39 of the cap strike the projections 41 at the lower end of the cams and the cap is lifted, and in so doing the shoulder 38 of the cap is brought against the outer inclined edge $33^a$ of the chuck 33, that chuck is contracted, and the inner edge 33' is pressed against the flange of the can-head and securely crimps the latter to the can-body. The cap, thence passing beyond the cam, falls of its own weight, the wedges drop into the cut-out portions 35 of the chucks, and force these chucks to open and release the can. The die continues its revolution and the can now headed and crimped passes onward on the carrier and is delivered as desired. It is understood that the number of dies, disks, &c., may be varied according to requirements. During this operation of heading some provision must be made for the increasing pressure brought upon the can by the revolution of the header, as otherwise the can would be buckled by the pressure exerted by the header at the lowest point of travel of the die. I relieve this pressure by means of a short secondary endless belt 42, placed beneath the endless carrier 2. The portion of the bottom of the trough 3 on which the carrier 2 runs is cut out beneath the header, so that the carrier rests upon this secondary belt, and the cans when they are acted upon by the dies may have a resilient bottom support. This belt or endless traveling support 42 consists of a chain having links 43 and cross-bars 44. It might occur that cans would not be fed regularly upon the carrier and that the revolving guide 19 might fail to pass a can successively through its slots, and in such a case it is desirable to stop the entry of a can-head into the dies of the header. For any such omissions in the feeding of the cans I have provided a mechanism by which the revolution of the carrier 25 is controlled. The sleeve 25' has clutch members 45, corresponding in number with the radial arms of the carrier 25. A sleeve 46, slidable on the shaft 26 in a groove 47, has clutch members which correspondingly engage the members of the sleeve 25'. On the spokes of the wheel 12 is an annular flange 48, having notches 48', likewise corresponding in number to the radial arms of the revolving carrier 25. The movement of this sleeve 46 is effected by a forked clutch-lever 49, fulcrumed upon the rock-shaft 50. On one of the forks of this clutch-lever 49 is a projection 58, adapted to engage the notches in the flange 48, as will be shortly shown. This rock-shaft is suitably supported at 51. From this shaft an arm 52 extends downwardly. A bell-crank lever 53 is pivoted at 54 and has one of its arm 55 extending horizontally into the carrier-trough and in the direction of travel of the carrier. A spring 57 bears against this lever, so as to keep the arm 55 lightly in touch with the sides of the passing can. When this arm 55 is thus in contact with the cans, the other arm of the lever 53 is extended at right angles to the trough and the arm 52 on the crank-shaft abuts against the end of this lever-arm. A weighted arm 56, secured to the rock-shaft 50, acts to throw the end of the arm 52 downward and toward the side of the trough. When the arm 52 upon the shaft 50 is thus in contact with the bell-crank lever, the clutch members of the sleeve 46 are thrown in line with the members of the sleeve 25' and the carrier 25 is made to revolve. However, the moment that the lever-arm 55 misses a can the action of the spring 57 forces the arm into the trough, where it remains until the next passing can again pushes it outward. This inward movement of the lever-arm leaves the end of the arm 52 to swing downward, since the support of the protruding arm of the lever 53 is removed. This downward movement of the arm 52 takes place the instant the projection 58 on the clutch-lever 49 drops into one of the notches 48' on the flange 48. This action of course throws the clutch out of engagement with the sleeve 25' and the revolving carrier 25 stops. The length of these notches 48' corresponds approximately to the width of the projecting clutch members of the sleeve 25'. As the wheel 12 revolves the projection 58 is forced out of the notch again by the inclined end in the notch and the sleeve 46 is pushed over toward the sleeve 25'; but the clutch members do not engage now, as the clutch-points of the sleeve 46 travel on the plane portion of the other sleeve for the space of nearly a third of a revolution. During this time the revolving carrier remains idle and no can-heads are delivered into the header. In other words, as long as cans continually pass through the machine the revolution of the can-head carrier and the feeding of the heads into the header, as before described, is unceasing; but in the event of a can missing the spring 57 pushes the arm of the bell-crank lever into the trough, the revolving cap-carrier comes to rest, and the sleeve-clutch 46 reciprocates upon the shaft 26, always missing the clutch members on the sleeve 25'. The position and relation of all these clutching and engaging members, their number and the number of the dies, and the action of the guide-wheel 19 are such that they all act concertedly and delay in one place is compensated for at another, so that the cans and heads may finally come together properly.

Having thus described my invention, what I claim as new, and desire to secure by Letters Patent, is—

1. The combination, in a can-heading machine, of a horizontal endless carrier upon which the cans are carried through the machine, means by which the passage of cans on the carrier is timed and regulated, a vertically-revolving header disposed in a vertical plane above the carrier and provided with radial arms carrying pivotally-mounted dies adapted to engage and fit over the flanges of the can-heads, means for delivering can-heads to said dies, and means by which the heads are deposited by the dies upon the cans.

2. The combination, in a can-heading machine, of a horizontally-traveling can-carrier, a vertically-revolving can-header said header having radial arms and pivotally-mounted dies carried thereby around its periphery adapted to receive can-heads, can-head-feeding devices, and means whereby the heads are placed upon the cans in the revolution of the header and the horizontal travel of the can-carrier.

3. The combination of a horizontal can-carrier, means by which the admission and timing of the cans thereon are regulated, a vertically-revolving carrier upon which the heads are received, a vertically-revolving can-header disposed above the can-carrier and including radial arms and pivoted dies carried thereby and into which the heads are received from the head-carrier, and means by which the heads are deposited by the dies upon the can, as the dies, and the cans upon the carrier, approach each other.

4. The combination of a horizontal can-carrier, means by which the admission and timing of the cans thereon are regulated, a vertically-revolving can-head carrier, a vertically-revolving can-header above the can-carrier with radial arms having pivotally-mounted dies or holders at their outer ends, and means by which the can-header automatically deposits the heads upon the cans as the latter and the dies approach each other.

5. The combination in a can-heading machine, of a horizontal can-carrier means by which the entry of the cans thereon is regulated and timed in relation to the entry of can-heads into the machine, a vertically-revolving can-head carrier, a vertically-revolving can-header having radial arms, can-head-receiving dies carried by the outer ends thereof, said can-head carrier and can-header being in a vertical plane above the can-carrier and operating so in unison with the travel of the cans upon their carrier that a can passing beneath the can-header will receive a head from one of the dies thereof, and means by which the head is crimped upon the can.

6. The combination in an automatic can-heading machine, of an endless carrier, means by which the entry of cans thereon is governed, a revolving spacing and timing guide including a wheel with oblique passages through it whereby the travel of the cans on the carrier is regulated, a can-head feeder into which the heads are received, and means by which the flanges of the heads are prevented from overlapping, a revolving carrier including radial arms and disks at the outer ends thereof by which the heads are taken singly from the feeder and delivered into holders or dies upon a vertically-revolving header, and means by which the can-heads are placed and crimped upon the cans.

7. In a can-heading machine, the combination with a horizontal endless conveyer and a guide-trough in which the conveyer runs, of a lever pivoted so that one arm extends into the trough to interrupt the passage of the cans, a weight-arm by which this projecting arm is normally made to extend into the trough, a third arm intermittently engaging with the driving mechanism whereby the movement of this lever is operated in relation to the running of the rest of the machine.

8. In a can-heading machine, a horizontal endless carrier, guides by which cans upon this carrier are prevented from lateral displacement, a lever-arm by which cans are intermittently admitted upon the carrier, a wheel revolving in a plane transverse to the line of the carrier, and having oblique slots in its rim through which the cans on the carrier intermittently pass, and means by which the heads are automatically inserted upon the cans.

9. In a can-heading machine a horizontal endless carrier, means by which the entry and travel of the cans on this carrier are regulated relatively with the running of the rest of the machine, a can-head feeder having a curved bottom, an inwardly-curved rear wall, an opening between this wall and the bottom through which the edge of the can-head may project and be engaged by a revolving carrier, taken thence and delivered into holders or dies upon a revolving header, and by these dies placed and crimped upon the cans.

10. The combination in a can-heading machine of a horizontal endless carrier, means by which the entry and travel of the cans on this carrier are regulated relatively with the running of the rest of the machine, a can-head feeder from which the heads are taken singly by a revolving carrier, said carrier consisting of radial arms having disks upon their outer ends adapted to engage and fit within the flanges of the can-heads, and means by which the heads are placed upon the cans.

11. In a can-heading machine, a revolving header consisting of radial arms having holders or dies pivotally secured at their outer ends, and into which can-heads are received, said header revolving above and in a plane vertical with an endless carrier upon which latter the cans are conveyed, and upon which cans the heads are placed in the revolution of the header.

12. In a can-heading machine, a revoluble can-head holder consisting of radial arms and dies pivotally carried at the outer portions thereof said dies including an outer funnel-shaped portion, a pressure-plate, expansible disks intermediate of this funnel portion and pressure-plate, means by which the parts are held together, and means by which the disks are equally and simultaneously opened and contracted.

13. In a can-heading machine, a can-head holder or die, consisting of an outer funnel-shaped portion, a pressure-plate, expansible disks or chucks intermediate of these parts, the lower one of these chucks having the edge of its opening inclined inwardly and upwardly to permit the ready entry of the can-head by pressure, the upper chuck having the edge of its opening inclined downwardly and inwardly by which the flange of the head is crimped upon the can, and means by which the chucks are equally and simultaneously opened and contracted.

14. In a can-heading machine, the combination with a can-body support of a pivotally-mounted die or holder having two expansible disks, means for inserting a can-head therein, and means by which the head is placed upon the can-body, the upper of said disks adapted to move inwardly and impinge equally and simultaneously upon all sides of the head as pressure is brought upon said head and body whereby the head is crimped upon the body.

15. In a can-heading machine, a can-head holder and crimper including an inclosing cap, pivotally mounted; expansible disks within the cap; and means by which the disks are held together and allowed to slide radially upon each other; said cap having its inner walls beveled or cam-shaped and adapted to engage and contract the disks.

16. In a can-heading machine, a revoluble can-header having hollow caps disposed around its periphery and pivotally mounted; expansible disks within the cap and provided with radial slots; guide-pins by which the disks are held in position; and means for expanding the disks; said caps having their inner side walls beveled or tapered and adapted to engage the edges of the disks, whereby said disks are contracted.

17. In a can-heading machine, a can-head holder or die consisting of a funnel-shaped portion, a pressure-plate, chucks interposed therebetween, the outer edges of these chucks inclined outwardly and upwardly, the lower of said chucks having the edge of its opening inclined upwardly and inwardly, the upper chuck having the edge of its opening inclined downwardly and inwardly, a ring or cap slidable upon the edges of the die, and means by which the cap is held in position on the die, a ledge upon the inner wall of the cap by which the outer inclined edges of the chucks are engaged and the latter caused to contract, and means by which the chucks are automatically opened or spread.

18. In a can-heading machine, the combination with a horizontal endless carrier upon which the cans are conveyed, of a revolving header placed vertically above and in line with the carrier, said header having radial arms carrying dies or holders pivotally secured at their outer ends, said dies having expansible chucks into which the can-heads are received, a cap slidable upon each of the dies, and means by which the cap is held in position on the die, rollers upon the cap engaging cams in the revolution of the header, by which means the cap is lifted, the lower chuck contracted and the can-head held within the die, means by which the die and the head are forced over and upon the end of a can upon the carrier, and means by which the cap is further lifted and the second chuck contracted and the head crimped.

19. The combination in a can-heading machine with an endless carrier upon which the cans are conveyed, of a secondary endless carrier parallel with the first and upon which the first carrier runs, and for which latter the secondary carrier forms a resilient bed.

20. The combination in a can-heading machine with an endless conveyer upon which the cans are carried, and a revolving carrier upon which the can-heads are received and thence delivered into a header device by which they are inserted upon the cans, of a means by which the revolution of this carrier may be stopped and the feeding of the can-heads delayed in case a can fails to enter the endless carrier properly, which means consists of a bell-crank lever having an arm projecting into the trough through which the endless conveyer runs, and which arm is adapted to engage the passing cans, and connections of this bell-crank lever with a clutch mechanism upon the shaft of the revolving carrier whereby the latter is thrown in and out of engagement automatically.

21. The combination in a can-heading machine of a horizontal endless carrier, a guide-trough in which this carrier runs, a stop-lever actuated intermittently by which the entry of cans on the carrier is regulated, a revolving guide consisting of a wheel having transverse and oblique slots in its rim through which the cans upon the belt intermittently pass, a can-head feeder into which the can-heads are received and prevented from overlapping one another, a revolving carrier having radial arms adapted to withdraw the heads from the feeder and place them singly in dies or holders pivotally secured upon a revolving header, means by which this revolving carrier can be stopped in case a can should fail to come properly upon the endless carrier, said dies consisting of a funnel portion, a pressure-piece, expandible disks or chucks intermediate thereof, a cap slidable upon the edges of each of the dies and means by which it is held in position, said cap adapted to contact the chucks when lifted toward the center of the header and to open the chucks when moved outwardly, rollers upon these caps, cams by which these rollers are engaged and by which the said inward movement of the caps is effected, and a secondary endless carrier beneath the can-carrier, and upon which this latter carrier is resiliently supported as the cans pass beneath the header and receive their heads, and means by which the mechanism above the endless carrier may be raised or brought nearer to said carrier in order to accommodate cans of varying heights.

22. The combination in an automatic can-heading machine of a carrier for the cans, means for regulating the entry and passage of cans thereon, means for delivering can-heads into holders or dies upon a revolving header, and by which the heads are placed upon the cans, and a lifting-screw by which the frame carrying the regulating, feeding and heading mechanism is adjustable vertically above the carrier according to the heights of cans, and guides by which this frame is held from lateral or longitudinal displacement.

In witness whereof I have hereunto set my hand.

WILLIAM T. JONES.

Witnesses:
S. H. NOURSE,
CHAS. E. TOWNSEND.